(12) United States Patent
Yim et al.

(10) Patent No.: US 12,387,724 B2
(45) Date of Patent: Aug. 12, 2025

(54) HUMAN-IN-THE-LOOP VOICE AUTOMATION SYSTEM

(71) Applicant: Google LLC, Mountain View, CA (US)

(72) Inventors: Keun Soo Yim, San Jose, CA (US); Ilya Firman, Sunnyvale, CA (US); Adam Miller Coimbra, Mountain View, CA (US); Robert James Berry, New York, NY (US); Mugurel Ionut Andreica, Thalwil (CH); Mikhail Reutov, Zurich (CH); Gabriel Oak Taubman, Brooklyn, NY (US); Cliff Shan Kuang, San Francisco, CA (US); Michael Oh, Santa Clara, CA (US); Svetoslav Radoslavov Ganov, Alamo, CA (US); Kalyana Ram Desineni, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 294 days.

(21) Appl. No.: 18/013,083

(22) PCT Filed: May 31, 2022

(86) PCT No.: PCT/US2022/031581
§ 371 (c)(1),
(2) Date: Dec. 27, 2022

(87) PCT Pub. No.: WO2023/234931
PCT Pub. Date: Dec. 7, 2023

(65) Prior Publication Data
US 2023/0274737 A1    Aug. 31, 2023

(51) Int. Cl.
*G10L 15/00* (2013.01)
*G10L 15/18* (2013.01)
*G10L 15/22* (2006.01)

(52) U.S. Cl.
CPC .......... *G10L 15/22* (2013.01); *G10L 15/1822* (2013.01); *G10L 2015/223* (2013.01)

(58) Field of Classification Search
CPC .......... G10L 15/22; G10L 15/30; G06F 3/167
See application file for complete search history.

(56) References Cited

U.S. PATENT DOCUMENTS

| | | | |
|---|---|---|---|
| 6,408,272 B1 * | 6/2002 | White | G10L 15/30 |
| | | | 704/E15.047 |
| 8,165,886 B1 * | 4/2012 | Gagnon | G10L 15/26 |
| | | | 715/728 |

(Continued)

FOREIGN PATENT DOCUMENTS

| | | | |
|---|---|---|---|
| WO | WO 2020040753 | 2/2020 | |
| WO | WO 2021107951 | 6/2021 | |
| WO | WO-2021204098 A1 * | 10/2021 | G06F 9/451 |

OTHER PUBLICATIONS

International Search Report and Written Opinion for PCT/US2022/034936, mailed on Jan. 30, 2023, 13 pages.

(Continued)

*Primary Examiner* — Daniel Abebe
(74) *Attorney, Agent, or Firm* — DORITY & MANNING, P.A.

(57) ABSTRACT

The present disclosure is directed to automating user interactions in an application. In particular, the computing device can determine, based on the input data, an intent associated with performing an action on the computing device. Additionally, the computing device can invoke, using an application-level assistant component configured to provide an application-level interface on the computing device, execution of an application. Moreover, the computing device can transmit, to a system-level assistant component configured to provide a system-level interface with the computing device, instructions to interface with an actionable compo- (Continued)

nent of the application. The instructions can be transmitted using a trusted intermediary component configured to facilitate an interface between the system-level assistant component and the application-level assistant component. Furthermore, the computing device can engage, using the system-level assistant component, the actionable component of the application to perform the action.

21 Claims, 9 Drawing Sheets

(56) References Cited

U.S. PATENT DOCUMENTS

| | | |
|---|---|---|
| 11,087,359 B1 | 8/2021 | Agarwal et al. |
| 11,488,589 B1* | 11/2022 | Fregly .................... G10L 15/22 |
| 11,500,672 B2* | 11/2022 | Zeitlin ................ H04M 3/4936 |
| 2002/0065654 A1* | 5/2002 | Grant .................... G10L 15/193 |
| | | 704/E15.044 |
| 2020/0076901 A1* | 3/2020 | Smith ................. H04M 3/4938 |
| 2020/0160860 A1 | 5/2020 | Singh et al. |
| 2020/0168217 A1* | 5/2020 | Webster ................. G11B 31/00 |
| 2020/0249985 A1* | 8/2020 | Zeitlin .................. G10L 15/285 |
| 2022/0113934 A1 | 4/2022 | Lee et al. |

OTHER PUBLICATIONS

International Preliminary Report on Patentability for PCT/US2022/031581, mailed on Dec. 12, 2024, 11 pages.

* cited by examiner

HUMAN-IN-THE-LOOP VOICE AUTOMATION SYSTEM

PRIORITY CLAIM

This application is based upon and claims the right of priority under 35 U.S.C. § 371 to International Application No. PCT/US2022/031581, filed on May 31, 2022. International Application No. PCT/US2022/031581 is hereby incorporated by reference herein in its entirety.

FIELD

The present disclosure relates generally to systems and methods for automating tasks on a mobile device using a voice assistant. More particularly, the present disclosure relates to automating user interface actions in a mobile application of a mobile device with human-in-the-loop functionality.

BACKGROUND

Computing devices can automate many tasks and provide various functionality. Users may provide a request to an application-level assistant component using spoken natural language input (e.g., spoken utterances). An application-level assistant component responds to a request by providing responsive user interface output, which can include audible and/or visual user interface output. Application-level assistant components are configured to be interacted with via spoken utterances, such as an invocation indication followed by a spoken query. A client device can include an assistant interface that provides, to a user of the client device, an interface for interfacing with the application-level assistant component (e.g., receives spoken and/or typed input from the user, and provides audible and/or graphical responses), and that interfaces with one or more additional components that implement the application-level assistant component (e.g., remote server device that process user inputs and generate appropriate responses).

SUMMARY

Aspects and advantages of embodiments of the present disclosure will be set forth in part in the following description, or can be learned from the description, or can be learned through practice of the embodiments.

One example aspect of the present disclosure is directed to a computing device. The computing device can include one or more processors, and one or more memory devices storing instructions that are executable by the one or more processors to cause the one or more processors to perform operations. The operations can include determining, based on input data associated with a user of the computing device, an intent associated with performing an action on the computing device. Additionally, the operations can include invoking, using an application-level assistant component configured to provide an application-level interface on the computing device, and execution of an application. Moreover, the operations can further include transmitting, to a system-level assistant component configured to provide a system-level interface with the computing device, instructions to interface with an actionable component of the application. The instructions can be transmitted using a trusted intermediary component configured to facilitate an interface between the system-level assistant component and the application-level assistant component. Furthermore, the operations can include engaging, using the system-level assistant component, the actionable component of the application to perform the action.

Another example aspect of the present disclosure is directed to a computer-implemented method. The method can include determining, based on input data associated with a user of a computing device, an intent associated with performing an action on the computing device. Additionally, the method can include invoking, using an application-level assistant component configured to provide an application-level interface on the computing device, execution of an application. Moreover, the method can include transmitting, to a system-level assistant component configured to provide a system-level interface with the computing device, instructions to interface with an actionable component of the application. The instructions can be transmitted using a trusted intermediary component configured to facilitate an interface between the system-level assistant component and the application-level assistant component. Furthermore, the method can include engaging, using the system-level assistant component, the actionable component of the application to perform the action.

A further example aspect of the present disclosure is directed to one or more non-transitory computer-readable media. The non-transitory computer-readable media can comprise instructions that when executed by one or more computing devices cause the computing device(s) to perform operations. The operations can include determining, based on input data associated with a user of a computing device, an intent associated with performing an action on the computing device. Additionally, the operations can include invoking, using an application-level assistant component configured to provide an application-level interface on the computing device, and execution of an application. Moreover, the operations can include transmitting, to a system-level assistant component configured to provide a system-level interface with the computing device, instructions to interface with an actionable component of the application. The instructions can be transmitted using a trusted intermediary component configured to facilitate an interface between the system-level assistant component and the application-level assistant component. Furthermore, the operations can include engaging, using the system-level assistant component, the actionable component of the application to perform the action.

In some implementations, the actionable component can be an input field, and the engagement of the actionable component can include inputting a value in the input field. In some implementations, the actionable component can be a rendered output, and the engagement of the actionable component can include parsing rendered output to identify input fields. In some implementations, the actionable component can be an API. In some implementations, the intent can be determined with the application-level assistant component. In some implementations, the system-level assistant component can generate an input comprising data unavailable to the application-level assistant component.

In some implementations, the operations can further include determining missing information and generating a follow-up query. Additionally, the operations can further include the system-level assistant component generating a follow-up query. Furthermore, the operations can further include the system-level assistant component parsing a response to the follow-up query. Moreover, the operations can further include the system-level assistant component initially parsing a response to follow-up query and handing off to the application-level assistant component.

In some implementations, the system-level assistant component can perform an automatic speech recognition (ASR) technique and application-level assistant component can perform a natural-language understanding (NLU) technique.

In some implementations, the operations further include the computing device receiving the content item comprising application-level assistant component. The content item can be obtained from a real-time content selection component of a remote server. For example, a custom chatbot experience for businesses can be performed by the computing device by receiving the content item.

In some implementations, the operations further includes the computing device retrieving, using application-level assistant component, a content item obtained from a real-time content selection component of a remote server, the content item comprising the application.

Another example aspect of the present disclosure is directed to a computing device. The computer device can include a first system, a second system, and a third system. The first system can perform user interface (UI) actions on a plurality of mobile applications. The second system can include a virtual assistant application. The third system can have one or more application program interfaces (APIs) between the first system and the second system. Additionally, the computer device can include one or more processors, and a memory storing instructions that when executed by the one or more processors cause the computer device to perform operations. The device can receive, via an interface of the computing device, a user request having audio data. Additionally, the device can determine, based on the user request, a first query and a second query. Moreover, the device can transmit the first query to a first system. The first query being associated with the first system performing a first UI action on a, first mobile application. Furthermore, the device can transmit, using a third system, a first parameter generated by the first UI action to a second system having a virtual assistant application. The third system includes one or more application program interfaces between the first system and the second system. Subsequently, the device can perform; using the second system, a high-level action based on the second query and the first parameter.

Another example aspect of the present disclosure is directed to a computer-implemented method. The method can include receiving, via an interface of the computing device, a user request having audio data. Additionally, the method can include determining, based on the user request, a first query and a second query. Moreover, the method can include transmitting the first query to a first system. The first query can be associated with the first system performing a first UI action on a first mobile application. Furthermore, the method can include transmitting, using a third system, a first parameter generated by the first UI action to a second system having a virtual assistant application. The third system can include one or more application program interfaces (APIs) between the first system and the second system. Subsequently, the method can include performing, using the second system, a high-level action based on the second query and the first parameter.

A further example of the present disclosure is directed to one or more non-transitory computer-readable media. The non-transitory computer-readable media can comprise instructions that when executed by one or more computing devices cause the computing device(s) to perform operations. The operations include receiving, via an interface of the computing device, a user request having audio data. Additionally, the operations can include determining, based on the user request, a first query and a second query. Moreover, the operations can include transmitting the first query to a first system, the first query being associated with the first system performing a first UI action on a first mobile application. The operations can include transmitting, using a third system, a first parameter generated by the first UI action to a second system having a virtual assistant application. The third system can include one or more application program interfaces (APIs) between the first system and the second system. Subsequently, the operations can include performing, using the second system, a high-level action based on the second query and the first parameter.

In some implementations, the high-level action performed by the second system can be to ask a question. The operations can further include determining, based on the user request, a third query. Additionally, the operations can include receiving, via the interface of the computing device, an answer in response to the question. Moreover, the operations can include modifying the third query based on the answer.

In some implementations, the modification of the third query includes altering one or more parameters being transmitted between the first system and the second system. In some implementations, the modification of the third query includes altering a sequence path associated with subsequent queries to be performed by the first system or the second system.

In some implementations, the first system has system-level privileges that are higher than privileges associated with the virtual assistant application of the second system. In some implementations, the first system includes a system-level assistant component running as part of an operating system of the computing device. In some implementations, the computing device is a mobile device, and wherein the first system is part of the middleware of the mobile device.

In some implementations, the first UI action performed by the first system is scrolling and clicking a button on a page of the first mobile application. In some implementations, the high-level action performed by the second system is to open a second mobile application from the plurality of mobile applications. In some implementations, the high-level action performed by the second system is to play a video.

In some implementations, the operations further include determining, based on the user request, a third query. Additionally, the operations include transmitting, using the third system, a second parameter generated by the second system to the first system. Moreover, the operations include transmitting the third query to the first system, the third query being associated with the first system performing a second UI action on the second mobile application.

In some implementations, the virtual assistant application is stored in virtual memory associated with a user-space. In some implementations, the parameters transferred between the first system and the second system are only transmitted using the third system.

In some implementations, the trusted intermediary component includes a middleware API. In some implementations, the trusted intermediary component includes an operating system kernel API. In some implementations, the trusted intermediary component includes a direct remote procedure call (RPC)-based API.

In some implementations, the computing device can obtain user consent before the first system performs the first UI action on the first mobile application. Additionally, the computing device can display, while the first system is performing the first UI action, an indicator on a display of the computing device that the first system is controlling the computing device.

Another example of the present disclosure is directed to a computing device that includes one or more processors, and one or more memory devices storing instructions that are executable by the one or more processors to cause the one or more processors to perform operations. The computing device can determine, based on input data associated with a user of the computing device, an intent associated with performing an action on the computing device. The computing device can be invoked, using an application-level assistant component (e.g., application-level assistant component 220) configured to provide an application-level interface on the computing device, execution of an application (e.g., mobile application). The computing device can transmit, to a system-level assistant component (e.g., automation service) configured to provide a system-level interface with the computing device, instructions to interface with an actionable component of the application (e.g., mobile application). The instructions can be transmitted using a trusted intermediary component configured to facilitate an interface between the system-level assistant component and the application-level assistant component. The computing device can engage, using the system-level assistant component (e.g., automation system), the actionable component of the application to perform the action.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
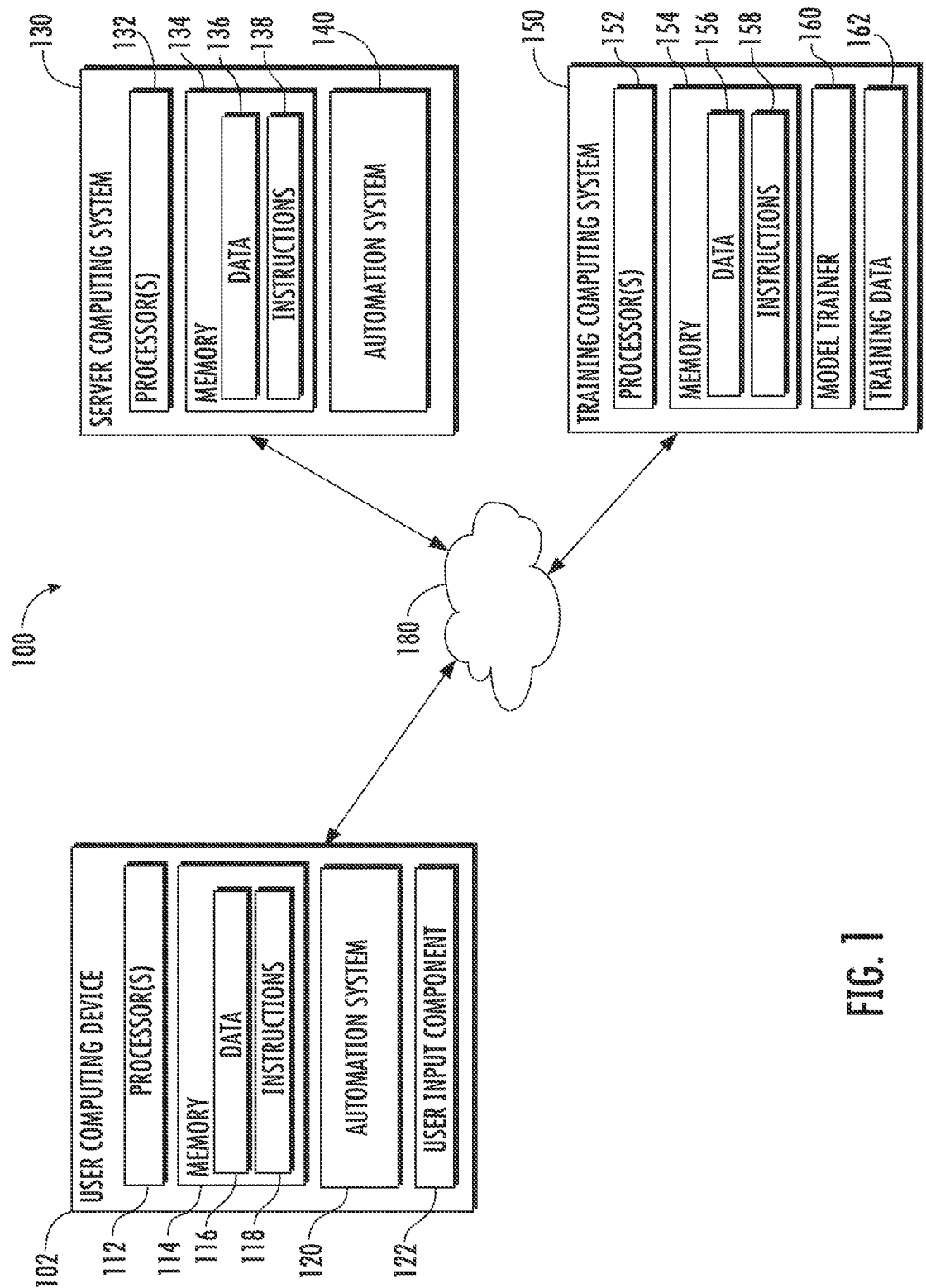
FIG. 1 depicts a block diagram of an example computing system that performs automation techniques according to example embodiments of the present disclosure.

A user can interact with an application-level assistant component (e.g., virtual assistant, automated assistant, interactive personal assistants, intelligent personal assistants) by providing user input to the automation system after the automation system has been invoked. In some instances, the user interface inputs that can invoke the automation system via a client device include a hardware and/or virtual button at the client device for invoking the automation system (e.g., a tap of a hardware button, a selection of a graphical interface element displayed by the client device). The automation system can additionally or alternatively be invoked in response to one or more spoken invocation phrases, such as trigger words.

The user input can be a natural language input (e.g., spoken utterance) associated with a request. For instance, automatic speech recognition and/or natural language understanding of the spoken utterance can be performed by the automation system. Automatic speech recognition (ASR) can be performed by the automation system in order to detect certain terms that can correspond to particular actions capable of being performed. Alternatively, or additionally, natural language understanding (NLU) can be performed by the automation system in order to identify certain intent(s) capable of being performed. The automation system can process the request and respond to the request with a user interface output. Additionally, a user may want to interact with the automation system to operate other applications (e.g., third-party applications installed on a client device).

As application-level assistant component (e.g., virtual assistant) becomes an important part of mobile user experience, techniques described herein can increase the capabilities of an application-level assistant component (e.g., what users can do using an application-level assistant component on smartphones) to improve the mobile user experience. The automation system enables fulfillment of actions performed on a mobile application, while also reducing the feature development and maintenance cost by reusing the existing functionalities in a large number of mobile applications.

In some implementations, the automation system enables voice-centric mobile application automation to significantly extend the fulfillment capabilities of a virtual assistant with mobile applications. voice-centric mobile application automation includes certain tasks that are automatable (e.g., clicking and filling in forms, sending data to another user). The automation tasks performed by the automation system include a series of user interface (UI) actions. Such automation tasks can be classified into three subtypes: (1) tasks that the user wants to perform manually; (2) tasks that the user wants to supervise; and (3) tasks that the user does not want to supervise. The automation system can automatically perform tasks that are associated with subtypes (2) and (3).

Both subtypes (2) and (3) can require human-in-the-loop-style execution (e.g., implementation). For example, subtype (2) may require human-in-the-loop implementation because the user may want to stop and alter the process. Subtype (3) may require human-in-the-loop implementations when as part of execution the automation flow, the automation system determines that one or more parameter values are needed to be obtained from the user. The automation system enables human-in-the-loop voice automation for mobile applications. Unlike a conventional end-to-end automation, human-in-the-loop automation enables users to alter the process flows and interact with content of the mobile application, while a vast majority of the tedious tasks can be automated by the automation system.

Example embodiments according to aspects of the present disclosure relate to automating user interface actions in a mobile application of a mobile device using an automation system. The automation system can include an application-level assistant component, a system-level assistant component, and a trusted intermediary component to interface between the application-level assistant component and the system-level assistant component. In one example, a user can request the automation system to obtain data from a first mobile application (e.g., photo application) and transmit the obtained data to a person named 'John' using a second mobile application (e.g., email application). The automation system can automate the process by executing scripts on each of the mobile applications and present the user interface actions to the user as each script is being executed. This allows the user the ability to change or modify the process in real-time while viewing the user interface actions. Continuing with the example, while viewing the script being executed to automatically send the data using the second mobile application, the user may decide that the automation process is sending the data to a different 'John,' so may modify the process by selecting the correct 'John' to send the data. Alternatively, or additionally, the automation system can ask the user a clarifying question regarding which 'John' to send the data, when the automation system determines that there are multiple people named 'John.'

The automation system described herein differs from conventional website automation systems, because conventional website automation systems specifically targets web browsers. In contrast, the automation system 200 enables the automation of a query fulfillment process on mobile applications of a mobile device. Conventional website automation systems are designed to interface with web pages (e.g., HTMLs), while automation system 200 is designed to interface with mobile applications and execute actions on the user interface of a mobile application.

Additionally, the automation system described herein is different from conventional systems that automate recurring activities or queries. Automating a recurring mobile application activity or query can include suggesting an automated action based on a similar context (e.g., day of week, time of day, and location). However, both recurring queries and activities are for one action and does not automate user journeys across a plurality of mobile applications or a plurality of actions in one mobile application.

The technology described herein can provide a number of technical effects and benefits. For example, as previously indicated, the technology described herein can improve security, partly because the execution of the UI scripts are handled by the system-level assistant component, which can be a system application that is running in a private compute core (PCC) sandbox. Additionally, the application-level assistant component can interact with the system-level assistant component by encapsulating the context and UI actions of the mobile application as augmented built-in intents (BIIs). The augmented BIIs can be coarse-grained descriptions of actions and thus are allowed, security-wise, by the platform of the mobile device. Additionally, by having the human-in-the-loop interface, the automation system provides additional safety checks such as the user consent dialog, UI indicator during the script execution, and system settings. Furthermore, the automation system (e.g., by using the trusted intermediary component) may track the interactions between system-level assistant component and the application-level assistant component such that it automatically triggers the system security features in real-time (e.g., starting to show the indicator when the script execution is started) if an issue is detected.

With reference now to the figures, example embodiments of the present disclosure will be discussed in further detail.

Example Devices and Systems

FIG. 1 depicts a block diagram of an example computing system 100 that performs automation techniques using an automation system according to example embodiments of the present disclosure. The system 100 can include a user computing device 102 and a server computing system 130 that can be communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, a smart device (e.g., smart television, smart appliance), a virtual reality system, an augmented reality system, or any other type of computing device.

The user computing device 102 can include one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include an automation system 120. An example automation system 120 is further discussed in FIG. 2.

Additionally, or alternatively, an automation system 140 can be included in or otherwise stored and implemented by the server computing system 130 that communicates with the user computing device 102 according to a client-server relationship. For example, the automation system 120 can be implemented by the server computing system 140. Thus, the automation system 120 can be stored and implemented at the user computing device 102 and/or the automation system 140 can be stored and implemented at the server computing system 130. In some implementations, the outputs from the automation system 140 can be received from the server computing system 130 over network 180, stored in the user computing device memory 114, and then used or otherwise implemented by the one or more processors 112.

The user computing device 102 can also include one or more user input components 122 (e.g., keyboard, microphone, camera) that receives user input. For example, the user input component 122 can be a touch-sensitive component (e.g., a touch-sensitive display screen or a touch pad)

that is sensitive to the touch of a user input object (e.g., a finger or a stylus). Other example user input components include a microphone, a camera, or other means by which a user can provide user input (e.g., audio data, video data).

Some user interface inputs that can invoke the automation system 120 via the user computing device 102 include a hardware and/or virtual button at the user computing device 102 for invoking the automation system 120 (e.g., a tap of a hardware button, a selection of a graphical interface element displayed by the client device). Many automation system 120 can additionally or alternatively be invoked in response to one or more spoken invocation phrases, such as trigger words. Also, for example, the automation system 120 may be invoked based on one or more gestures of the user, such as pressing a button on a device and/or motioning in a particular manner such that the motion can be captured by a camera of a device.

The server computing system 130 can include one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 can include or be otherwise implemented by one or more server computing devices. In instances in which the server computing system 130 includes plural server computing devices, such server computing devices can operate according to sequential computing architectures, parallel computing architectures, or some combination thereof. As described above, the server computing system 130 can store or otherwise include an automation system 140. An example automation system 140 is further described in FIG. 2.

The user computing device 102 and/or the server computing system 130 can train the automation system 120 and/or 140 via interaction with the training computing system 150 that can be communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the automation system 120 and/or 140 stored at the user computing device 102 and/or the server computing system 130 using various training or learning techniques. In particular, the model trainer 160 can train the automation system 120 and/or 140 based on a set of training data 162. The training data 162 can include, for example, previous user requests, answers in response to the user requests, clarifying questions, and actions automatically performed on the mobile applications.

In some implementations, if the user has provided consent, the training examples can be provided by the user computing device 102. Thus, in such implementations, the automation system 120 provided to the user computing device 102 can be trained by the training computing system 150 on user-specific data received from the user computing device 102. In some instances, this process can be referred to as personalizing the automation system.

The model trainer 160 can include computer logic utilized to provide desired functionality. The model trainer 160 can be implemented in hardware, firmware, and/or software controlling a general-purpose processor. For example, in some implementations, the model trainer 160 can include program files stored on a storage device, loaded into a memory and executed by one or more processors. In other implementations, the model trainer 160 can include one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The automation system 120 and/or 140 described in this specification may be used in a variety of tasks, applications, and/or use cases. In some implementations, the input to the automation system 120 and/or 140 of the present disclosure can be speech data, text, or natural language data. The automation system 120 and/or 140 can process the speech data, text, or natural language data to generate an output.

FIG. 1 illustrates one example computing system that can be used to implement the present disclosure. Other computing systems can be used as well. For example, in some implementations, the user computing device 102 can include the model trainer 160 and the training dataset 162. In such implementations, the automation system 120 can be both trained and used locally at the user computing device 102. In some of such implementations, the user computing device 102 can implement the model trainer 160 to personalize the automation system 120 based on user-specific data.

Figure 2:
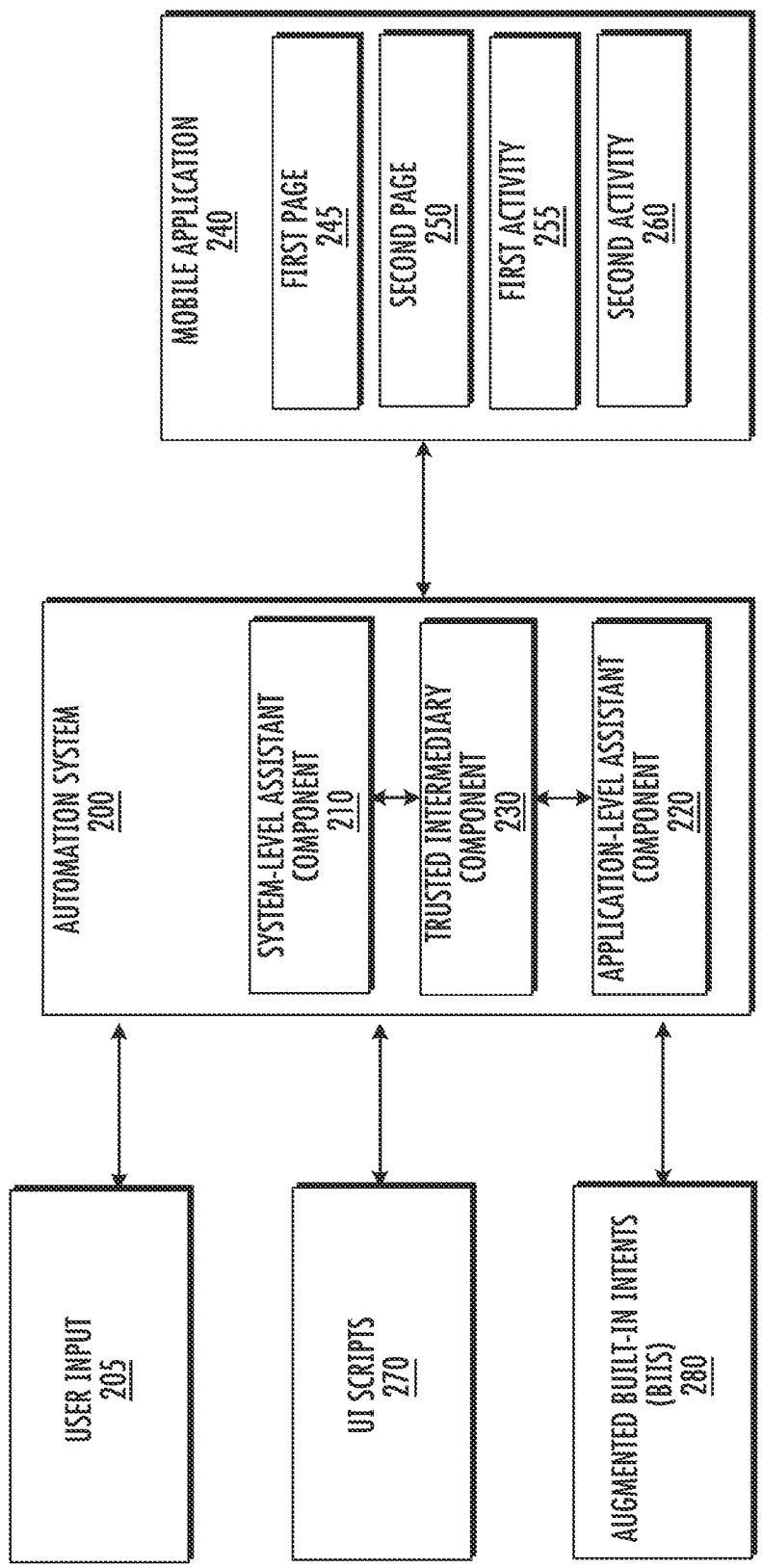
FIG. 2 depicts an example automation system according to example embodiments of the present disclosure.

FIG. 2 depicts an example automation system according to example embodiments of the present disclosure. The automation system 200 can be an example of the automation system 120 and/or automation system 140 in FIG. 1. The automation system 200 can include a system-level assistant component 210, an application-level assistant component 220, and a trusted intermediary component 230. The trusted intermediary component 230 can be one or more application program interfaces (APIs) between the system-level assistant component 210 and the application-level assistant component 220.

The system-level assistant component 210 can run as part of the system software (e.g., operating system or middleware). The system-level assistant component 210 can have extra privileges that are not typically available in user-space mobile applications. The application-level assistant component 220 can be a user-space virtual assistant application. The trusted intermediary component 230 can include middleware API, operating system kernel API, and/or direct RPC (remote procedure call)-based mechanisms.

In terms of execution (i.e., performer), the system-level assistant component 210 can perform low-level UI actions (e.g., scrolling and clicking a button). The application-level assistant component 220 can perform or be requested to perform high-level UI actions (e.g., opening an app or playing a video).

In terms of natural language process (NLP), the system-level assistant component 210 can include an automatic speech recognition (ASR), natural language understanding (NLU), and fulfillment logic for the low-level UI actions (e.g., low-level commands). In some instances, the system-level assistant component 210 may not have an ASR. The application-level assistant component 220 can include an ASR, NLU, and fulfillment logic by default for the high-level UI actions (e.g., high-level commands).

With regards to handover options, the automation system 200 can include a plurality of handover embodiments.

In a first handover embodiment, a user can use the application-level assistant component 220 (e.g., virtual assistant) to start a session (e.g., long-press home, hot-word triggering) and send an explicit query (e.g., start a sandbox mode) to handover to the NLU of the system-level assistant component 210.

In a second handover embodiment, a user can use the system-level assistant component 210 to start a session (e.g., a button on the system UI or an integrated application). If the query is not understood or fulfilled by the NLU of the system-level assistant component 210, then the system-level assistant component 220 can transmit the query to the NLU of the application-level assistant component 220 for processing. Continuing with this second embodiment, the system-level assistant component 210 uses the trusted intermediary component 230 to transmit the dictated query to the NLU of the application-level assistant component 220 in order to bypass the ASR of the application-level assistant component. This can improve the user experience by enabling the dictated query to be transmitted to the application-level assistant component without having to ask the user again for the request.

In a third handover embodiment, a user can use the system-level assistant component 210 to start a session and send an explicit query to hand over to the NLU of the application-level assistant component 220.

In a fourth handover embodiment, a user can use the application-level assistant component 220 to start a session. If the query is not understood or fulfilled by the NLU of the application-level assistant component 220, then the application-level assistant component 220 can transmit the query system-level assistant component 210. The NLU or fulfillers of system-level assistant component 210 can execute (e.g., perform) the request for certain types of queries. In this fourth handover embodiment, the application-level assistant component 220 can use the trusted intermediary component 230 to send the dictated query to NLU of the system-level assistant component 210 in order to bypass the ASR of the system-level assistant component 210. In some instances, the application-level assistant component 220 can use the trusted intermediary component 230 to send the dictated query to fulfillers of the system-level assistant component 210 in order to bypass both the ASR and NLU of the system-level assistant component 210.

With regards to types of journeys, the system-level assistant component can perform both multi-application journeys and multi-turn journeys in the same mobile application.

In the multi-application journey example, an automation can consist of a sequence of tasks for multiple mobile applications. The automation system 200 can automate the journey using a hierarchical approach. For example, the application-level assistant component 220 (e.g., user-space virtual assistant) can handle the inter-application journeys (e.g., opening a mobile application, sending an intent, or passing parameters between mobile applications), while the system-level assistant component 210 can handle the intra-application journeys (e.g., performing one or more UI actions on a specific activity of a mobile application, performing one or more UI actions on a specific page of a mobile application). By bifurcating the inter-application journeys and the intra-application journeys, the automation system can greatly improve the scalability and maintainability of the automation techniques described herein. For example, let assume that three mobile applications are used as part of an automation task, and for each mobile application there are five different versions which may require slightly altered scripts. Using the techniques described herein, this example may need a maximum of 15 total scripts (i.e., 3 different mobile applications×5 different versions for each of the mobile applications=15). In contrast, conventional automation techniques may require 125 total scripts (i.e., 5^3=5*5*5=125) because one script may be required to be written per automation task. Additionally, the 15 scripts that are developed for the hierarchical automation of the automation system 200 are reusable for other automation tasks that involve the same mobile applications, while the 125 scripts that are written for the conventional automation techniques are not reusable.

In the multi-turn journey example, the automation system 200 is able to obtain user inputs at runtime and process the user inputs at runtime. The core of human-in-the-loop automation can be that the automation system 200 can get the user inputs (e.g., via system UI) and process the user inputs at runtime. For example, the automation system 200 can use the user input data to derive the parameters for the following (e.g., subsequent) tasks. The automation system 200 can also send the data back to the application-level assistant component 220 (e.g., user-space virtual assistant application) so that the application-level assistant component 220 can alter the following tasks or ask relevant clarification questions to the user. In some implementations, private data (due to the privacy requirement) may only be available in the system-level assistant component 210 and thus cannot be transmitted to the application-level assistant component 220 (e.g., have to be kept in the system-level assistant component 210). In these implementations, the availability of such private data in the system-level assistant component 210 is known to the application-level assistant component 220, and as a result the application-level assistant component 220 can skips the derivation process to determine or obtain the private data from the user (e.g., not asking any clarification questions). Instead, the fulfillment command of the application-level assistant component 220 can specifies to use the private data available in the system-level assistant component 210.

In some implementations, the system-level assistant component 210 (also referred as a first system) enables an application-level assistant component 220 (also referred as a second system) to perform any tasks (e.g., low-level UI actions) on mobile application 240 of a mobile device that the user can manually perform. The automation system 200 can utilize the system-level assistant component 210 that is running as a system application in order to execute user interface (UI) scripts 270 based on received user input 205. Additionally, the automation system 200, by using the trusted intermediary component 230, can utilize the system framework that bridges between application-level assistant component 220, the system-level assistant component 210, and the target third-party applications (e.g., mobile application 240).

In some implementations, upon an invocation (e.g., based on user input 205) of the application-level assistant component 220, the system-level assistant component 210 uses the trusted intermediary component 230 (e.g., voice interaction session (VIS) API)) to retrieve context information from a page (e.g., first page 245, second page 250, and so on) of a mobile application 240 (e.g., third-party mobile application installed on a mobile device). For example, the first page 245 can be the home page of the mobile application 240, and the second page 250 can be the payment page of the mobile application. In some instances, the context information is retrieved from an activity (e.g., first activity 255, second activity 260, and so on) of the mobile application 240. For example, when the mobile application 240 is an email application, the first activity 255 can be sending of an email to a recipient, and the second activity 260 can be reading aloud a received email from a sender.

In some implementations, the capability and entity information of the mobile application 240 can be obtained by the system-level assistant component 210 running as a system application on a private compute core (PCC). The system-level assistant component 210 can send the context information obtained from the mobile application to an on-screen understanding engine. The on-screen understanding engine can derive context information to generate UI scripts 270. The UI scripts 270 enables the automation system 200 to perform an automated action associated with a page or activity of the mobile application 240. Additionally, the derived context information can be encoded in the form of a direct action, which can be then sent to the speech recognizer, and/or fulfillment pipelines of the application-level assistant component 220.

Subsequently, the fulfilled results can be sent to performers to open the page of the mobile application 240 activity and execute a script from the UI scripts 270. The script execution relies on the system-level assistant component 210, which can be invoked by using the trusted intermediary component 230 (e.g., VIS API)). The system-level assistant component 210 can obtain the respective script from the online infrastructure storing the UI scripts 270 and execute the script using a trusted intermediary component 230 (e.g., system API) that can drive certain UI actions on the mobile application 240.

The automation system 200 enables the automated fulfillment of actions in various mobile applications which have not been integrated with the mobile platform's application actions APIs. For example, the automation system 200 enables the fulfillment of actions without the need for the third-party developers of the mobile application to use the mobile platform's software development kit (SDK) to enable other applications on the mobile platform to execute an action on the mobile application.

In some implementations, the automation system 200 can automate UI actions associated with activities (e.g., capabilities) of a mobile application. The automation system 200 can use an application integration platform for built-in intents (BIIs) and NLU. The automation system 200 can include a set of fulfillers, a performer, and other associated platform modules of the application-level assistant component 220 to process user queries. For example, the automation system 200 is able to process user queries, even without a mobile application having been integrated with the platform's application actions APIs (e.g., actions are explicitly declared and supported by the mobile application), because the techniques described herein can extract the third-party application capabilities based on screen understanding of the different pages in the mobile application to enable UI script-based execution for third-party mobile applications. These techniques allow the automation system 200 to enable increasing the application-level assistant component 220 fulfillment capabilities. Furthermore, the system-level assistant component 210 can increase fulfillment capabilities in a mobile application without requiring any direct code changes in the mobile application. Given that the system-level assistant component 210 can have system-level privileges, the system-level assistant component 210 can rely on the system platform of the computing device to execute UI scripts in a mobile application.

Additionally, the automation system 200 can use augmented built-in intents (BIIs) 280 that have been extracted from the mobile application 240. In conventional application-level assistant component systems, an application-level assistant component can only perform certain actions on the mobile application that are explicitly declared and supported by the mobile application. By using augmented BIIs 280, the automation system 200 can extract from the mobile application 240 (e.g., by using the screen contexts) certain actions that can be performed, without the need for the mobile application to explicitly declare such actions. In some implementations, the system-level assistant component 210, which can be run as part of the mobile platform, can obtain (e.g., retrieve, receive) the augmented BIIs 280 for processing. The system-level assistant component 210 can include a dedicated system-level assistant component performer and modularized fulfillers for system-level assistant component 210. During implementation, the fulfiller of the system-level assistant component and other application related fulfillers can be tightly integrated depending on the data source and execution abstraction. The advantages of such dedicated fulfillers and performers in the system-level assistant component 210 include improved modularity, fault isolation, testability, and so on.

Moreover, the automation system 200 can process the user input 205 to generate one-time queries, explicit queries, follow-on queries, conversation-style queries, and other types of queries. Examples of one-time queries are "show sports news on <a news app>" and "send a message to <contact> on <a 3P messenger>".

The automation system 200 can fulfill queries by using a trusted intermediary component 230. The trusted intermediary component 230 can include a platform API to retrieve the augmented BIIs 280 associated with an activity (e.g., add an item to a shopping cart, purchase item(s) in a shopping cart) of a mobile application 240. Additionally, the platform API can execute the selected augmented BII 280 on the mobile application 240. For example, the platform API can rely on the system-level assistant component 210 that is run on a Private Compute Core (PCC). Given that the system-level assistant component 210 can run in a secure sandbox, the system-level assistant component 210 can have the requisite permissions to access the screen context and run the screen understanding modules so as to derive a list of augmented BIIs 280 from the screen context of the mobile application. The system-level assistant component 210 can, optionally, extract parameter values (e.g., entities or categorized texts on the screen) and return them as part of the BII values to the application-level assistant component 220.

The system-level assistant component 210 is able to retrieve the augmented BIIs 280 in such a way that it does not affect the user experience (e.g., in terms of UI rendering and query processing latencies). The system-level assistant component 210 can also capture the augmented BII data (i.e., serializable) as part of user context and flow it through the platform of the application-level assistant component 220 (e.g., for ASR, NLU, and fulfillment), without affecting any existing on-device or server-side NLP flows. The automated system 200 also minimizes code duplication and allows to build highly maintainable infrastructure that can be maintained by the existing virtual assistant infrastructure in an efficient way.

In one implementation, the user query can specify a target mobile application that is not in the foreground of the display of the mobile device by using an explicit query. In this implementation, the system-level assistant component 210 uses a backend pipeline that mines the augmented BIIs 280 and passes the augmented BIIs 280 to the on-device platform of application-level assistant component 220. The system-level assistant component 210 can transmit the augmented BIIs 280 into the on-device stack (e.g., POP) of the application-level assistant component 220 so that the augmented BII information can be used as part of the processing.

In some implementations, the trusted intermediary component 230 (e.g., DirectAction API) can call the system-level assistant component 210 if the user input 205 is associated with an augmented direct action. Upon invocation, the system-level assistant component 210 fetches a relevant UI script from the UI scripts 270 and executes the relevant UI script on an activity and/or page of a mobile application.

As part of the human-in-the-loop implementations, the system-level assistant component 210 can obtain user consent before executing the relevant UI script. Additionally, the system-level assistant component 210 can show a UI indicator on the screen while executing the relevant UI script. Subsequently, one or more parameters from the execution result can be returned to the application-level assistant component 220 via the trusted intermediary component 230.

The application-level assistant component 220 can have a platform that is able to fulfill queries from the system-level assistant component using information from the augmented BIIs 280. For example, the application-level assistant component 220 can generate a ClientOp that can be used to direct a performer, which then can call a trusted intermediary component (e.g., direct actions API) with an augmented direct action argument value.

Additionally, the application-level assistant component 220 can obtain the augmented BIIs 280 by using the trusted intermediary component 230 (e.g., direct actions API, context API). The information from the augmented BIIs 280 associated with an activity or page of the mobile application can be obtained in a way that does not delay any of the subsequent operations.

The application-level assistant component 220 can include fulfillers to perform explicit queries (e.g., ones that require opening an app or sending an intent with some specific parameter values before executing a script) by issuing multiple ClientOps. The application-level assistant component 220 can perform multi-app journeys (e.g., open app 1, replay script A, open app 2, and replay script B) in the near future. The fulfiller framework of the application-level assistant component 220 can rank the generated ClientOps or SemOps using provided product requirements. The product requirement can be updated as the relevant products introduce more use cases. Additionally, the ranking can be updated and/or modified by the training computing system 150 in order to optimize the fulfillment process.

Partly due to enhanced security measures, the trusted intermediary component 230 enables data (e.g., context and user data) to be transmitted from the system-level assistant component 210 to the application-level assistant component 220, and data to be transmitted from the application-level assistant component 220 to the system-level assistant component 210. Therefore, in some implementations, the data cannot be transmitted directly from the system-level assistant component 210 to the application-level assistant component 220 or from the application-level assistant component 220 to the system-level assistant component 210. For example, data (e.g., contact names) that are obtained from a mobile application 240 by the system-level assistant component 210 can be transmitted, via the trusted intermediary component 230, to the application-level assistant component 220 as part of the augmented BIIs 280.

Moreover, in order to improve performance and user experience, the application-level assistant component 220 and the system-level assistant component 210 can work together to ensure that the user consent is checked at the right moment, the relevant user opt-in flags are stored and used, and proper UI indicators are shown during any script executions. Some of such logic can be built in the automation system 200, while the triggering and control of such logic can be performed by the application-level assistant component 220.

Continuing with the human-in-the-loop implementations, the automation system 200 can check whether any of the required parameter values are missing in the given query and context information, and as a result ask clarification queries (e.g., "what do you want to search for?" for the user query "search on a social media application") and getting the missing information ahead of time even before the query can be fulfilled. As previously discussed, some of the contextual data may be sensitive and thus will be kept in the system-level assistant component 210 and not be shared with the application-level assistant component 220. The NLU can be expected to understand such data types and rely on the system-level assistant component 210 for filling in the parameter value fields.

Additionally, the application-level assistant component 220, using techniques described herein, can handle follow-on voice queries that are issued by the user without starting a new conversation. Without having to make the user re-invoke the application-level assistant component 220 for follow-on queries, the automation system can improve the user experience. This is beneficial because many of the user journeys involve conversation-style dialogues (e.g., taking notes or sharing photos).

Figure 3:
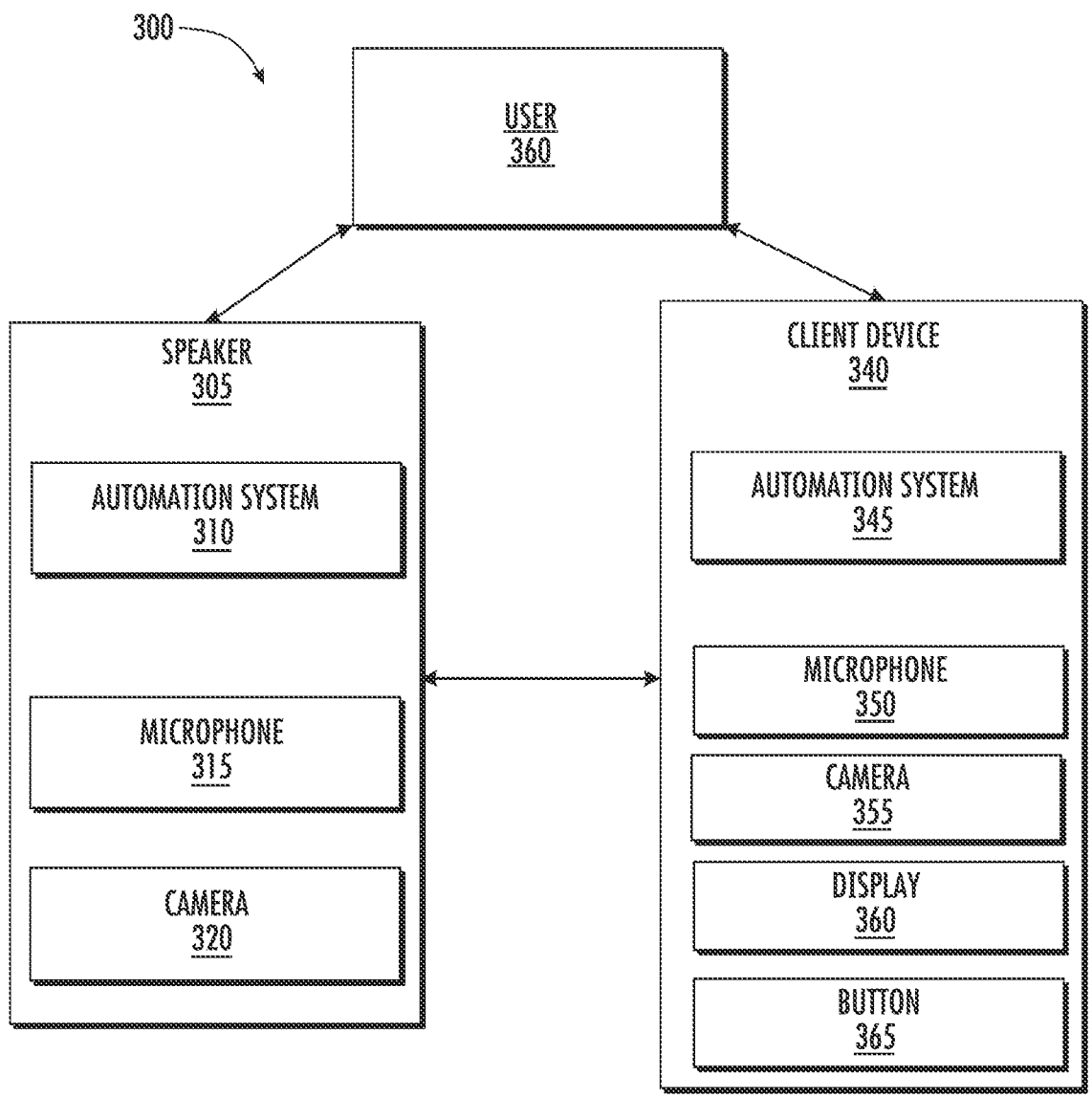
FIG. 3 depicts example environment in which an automation system is invoked by a client device or a user according to example embodiments of the present disclosure.

Referring to FIG. 3, an example environment 300 is provided which includes an automation system 310, 345 (e.g., automation system 120, automation system 140, automation system 200) that may be invoked by a user 360 or a client device 340 (e.g., user computing device 102 in FIG. 1). In one implementation, the application-level assistant component 220 in FIG. 2 can be an example of the automation system 310. The environment includes a standalone interactive speaker 305 with a microphone 315 and a camera 320. The speaker 305 may be executing, at least in part, an automation system 310 that may be invoked with an invocation phrase. In the example environment, the user 360 can speak a spoken utterance (e.g., "Okay Assistant, send a photo to person A) in proximity to the speaker 305. If the automation system 310 is configured to be invoked by the phrase "Okay Assistant," the invoked assistant may process the query that follows the invocation phrase (i.e., "send a photo to person A"). In some implementations, the automation system 310 can be capable of being invoked by the user performing one or more actions that can be captured by the cameras of the automation system 310. For example, automation system 310 can be invoked by the user looking in the direction of automation system 310, making a waving motion in the direction of automation system 310, and/or one or more other actions that can be captured by the camera of automation system 310.

Additionally, a client device 340 (e.g., user computing device 102 in FIG. 1, mobile device) can include an automation system 345 (e.g., automation system 120, automation system 140, automation system 200) that may be invoked by a user 360 or the speaker 305. The client device 340 can execute the automation system 345. The automation system 345 can be invoked by uttering an invocation phrase proximate to the client device 340 such that the audio may be captured by a microphone 350 and/or performing an action that may be captured by camera 355. Moreover, the automation system 345 can be invoked based on a user input (e.g., user pressing a button 365, user pressing an icon displayed on a graphical user interface 360).

In some implementations, user 360 may invoke the automation system 345 by pressing an icon displayed on the graphical user interface 360 to invoke the automation system 345. For example, pressing a first icon can invoke the application-level assistant component (e.g., application-level assistant component 220 of the automation system 200), and pressing a second icon can invoke the system-level assistant component (e.g., system-level assistant component 210 in automation system 200).

In some implementations, user 360 may invoke the automation system 310 and/or automation system 345 by uttering a first keyword associated with the application-level assistant component (e.g., application-level assistant component 220 of the automation system 200), or uttering a second keyword associated with system-level assistant component (e.g., system-level assistant component 210 in automation system 200). Further, user 360 may invoke the application-level assistant component by performing a first action and invoke the system-level assistant component by performing a second action. Based on which invocation phrase is uttered and/or which action is performed, the user 360 can indicate which of the multiple assistants that are executing on speaker 305 and/or client device 340 that the user 360 has interest in processing a spoken query. In some implementations, one or more of the automation systems of FIG. 3 may be absent. Further, the example environment may include additional automation systems that are not present in FIG. 3.

Each of the automation systems 310, 345 can include one or more components of the automation system described in FIGS. 1-2. For example, automation systems 310, 345 may include its own speech capture component to process incoming queries, visual capture component to process incoming visual data, hot word detection engine, and/or other components. In some implementations, the system-level assistant component 210 and the application-level assistant component 220 that are executing on the same device can share one or more components that may be utilized by both of the components. For example, the system-level assistant component 210 and the application-level assistant component 220 may share an on-device speech recognizer, on-device NLU engine, and/or one or more of the other components.

The automation system 310, 345 may be configured to process invocation input, such as an utterance that includes the phrase "OK Assistant" or other invocation input, which may indicate that the user has interest in providing a query. The automation system 310, 345 can include multiple components for processing a query, once invoked, for example, a local speech-to-text ("STT") engine (that converts captured audio to text), a local text-to-speech ("TTS") engine (that converts text to speech), a local natural language processor (that determines semantic meaning of audio and/or text converted from audio), and/or other local components. Because the client devices executing application-level assistant components may be relatively constrained in terms of computing resources (e.g., processor cycles, memory, battery, etc.), the local components may have limited functionality relative to any counterparts that are included in any cloud-based application-level assistant component components that are executing remotely in conjunction with the application-level assistant component(s).

In some implementations, the automation system 310, 345 may be invoked by one or more gestures that indicate that the user has interest in interacting with the primary application-level assistant component. For example, a user may demonstrate intention to invoke an application-level assistant component by interacting with a device, such as pressing a button or a touchscreen, perform a movement that is visible and may be captured by an image capture device, such as camera, and/or may look at a device such that the image capture device can recognize the user movement and/or positioning. When a user performs a gesture or action, the application-level assistant component may be invoked and begin capturing audio data that follows the gesture or action, as described above. Further, as described above, multiple application-level assistant components may be invoked by the same invocation input such that a particular gesture may be a common invocation to more than one application-level assistant component.

Example Graphical User Interfaces

Figure 4:
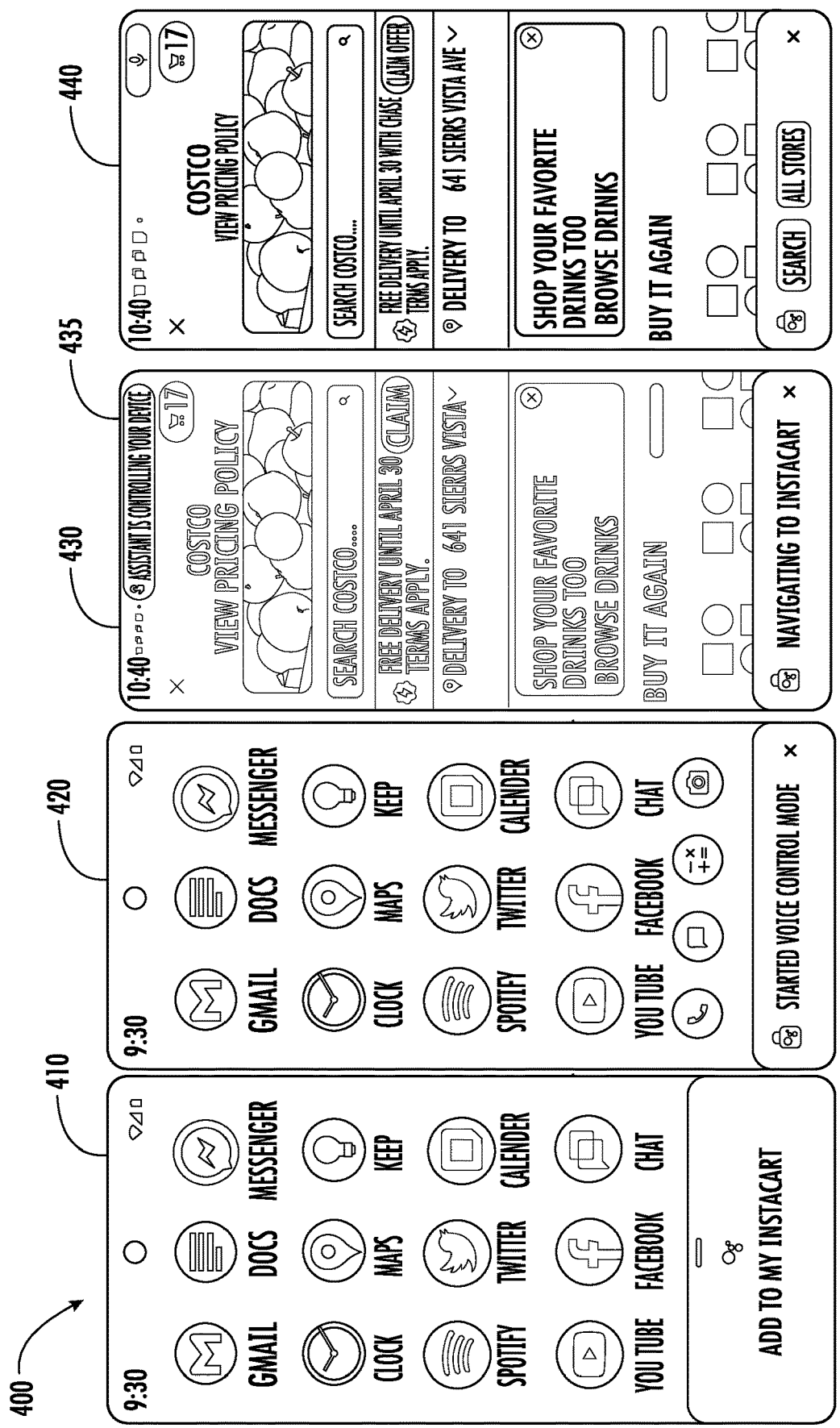
FIG. 4 depicts a user experience (UX) of a query example for adding an item to a shopping application according to example embodiments of the present disclosure.

FIG. 4 depicts a user experience (UX) of a query example for adding an item to a shopping application according to example embodiments of the present disclosure. As previously mentioned, the developers of the third-party application have not integrated (e.g., by implementing Direct Action handlers) the third-party application (e.g., shopping application) with the mobile platform so that other applications (e.g., application-level assistant component) can perform an action on the mobile application. Therefore, using conventional techniques, the application-level assistant component cannot fulfill the user's request to add an item in the shopping application. By using the techniques described in FIG. 2, the automation system 200 can receive a user request at 410 and initiate a voice control mode at 420. In response to receiving the user request at 410, the automation system (e.g., automation system 120, automation system 140, automation system 200, automation system 310, automation system 345) can obtain a UI script (e.g., from the plurality of UI scripts 270 in FIG. 2) to execute the action at 430. and fulfill the request at 430. During operation 430, the automation system can display to the user that the automation system is controlling the computing device of the user (i.e., as depicted at 435). Once the action at 430 is executed by the automation system, the automation system can give control back to the user (as part of the human-inthe-loop implementations) at 440 in order for the user to confirm (e.g., complete) the action (e.g., purchase the items in the shopping cart).

Example Methods

Figure 5:
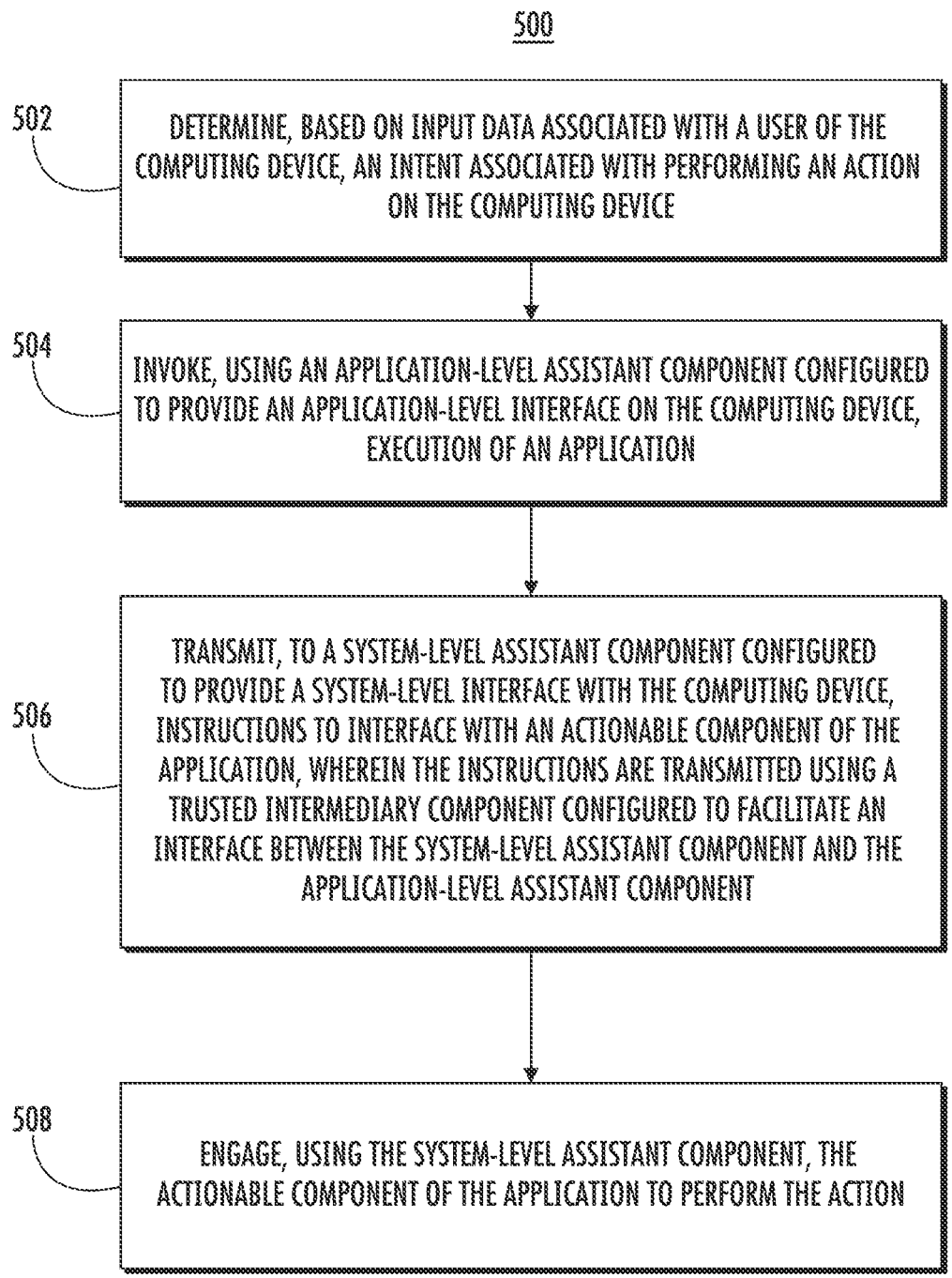
FIG. 5 depicts a flow chart diagram of an example method to automating an action to be performed on a mobile application according to example embodiments of the present disclosure.

FIG. 5 depicts a flow chart diagram of an example method for automating an action to be performed on an application according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, and/or adapted in various ways without deviating from the scope of the present disclosure.

In some implementations, a computing device (e.g., user computing device 102, server computing system 130, automation system 200, speaker 305, client device 340) can include an automation system (e.g., automation system 200). The automation system 200 can include a system-level assistant component 210, an application-level assistant component 220, and a trusted intermediary component 230. Additionally, the computing device can include one or more processors, and a memory storing instructions that when executed by the one or more processors cause the computer device to perform operations described in method 500.

At 502, the computing device can determine, based on input data associated with a user of the computing device, an intent associated with performing an action on the computing device. For example, the user input 205 described in FIG. 2 can be an example of the input data at 502.

In some implementations, the intent is determined at 502 with the application-level assistant component.

At 504, the computing device can invoke, using an application-level assistant component configured to provide an application-level interface on the computing device, execution of an application. For example, the application-level assistant component 220 described in FIG. 2 can be an example of the application-level assistant component at 504. Additionally, the mobile application 240 described in FIG. 2 can be an example of the application in 504.

At 506, the computing device can transmit, to a system-level assistant component configured to provide a system-level interface with the computing device, instructions to interface with an actionable component of the application. The instructions can be transmitted using a trusted intermediary component configured to facilitate an interface between the system-level assistant component and the application-level assistant component.

For example, the system-level assistant component 210 described in FIG. 2 can be an example of the system-level assistant component at 506. An actionable component of the application can include an action component associated with a first page 245, second page 250, first activity, second activity, and so on of the mobile application 240. Additionally, the trusted intermediary component 230 described in FIG. 2 can be an example of the trusted intermediary component at 506.

In some implementations, the trusted intermediary component can include one or more application program interfaces (APIs) between the system-level assistant component 210 and the application-level assistant component 220.

In some implementations, the actionable component at 506 can be an API.

At 508, the computing device can engage, using the system-level assistant component, the actionable component of the application to perform the action. For example, the system-level assistant component 210 described in FIG. 2 can be an example of the system-level assistant component at 508.

In some implementations, the actionable component at 506 can be an input field, and the engagement of the actionable component at 508 can include inputting a value in the input field.

In some implementations, the actionable component at 506 can be a rendered output, and the engagement of the actionable component at 508 can include parsing rendered output to identify input fields.

In some implementations, the system-level assistant component can generate an input having data unavailable to the application-level assistant component. For example, the action performed at 508 can include the system-level assistant component 210 generating an input that includes data (e.g., user data) that is unavailable to the application-level assistant component 220.

In some implementations, the engagement performed at 508 can include determining missing information and generating a follow-up query. For example, the system-level assistant component 210 can determine that the value to be inputted in the input field is unknown, and therefore the automation system 200 can ask a follow-up query to the user.

In some implementations, when missing information is determined at 508, method 500 can further include initiating a follow-up query requesting the missing information. For example, method 500 can further include the system-level assistant component generating a follow-up query. Furthermore, the system-level assistant component can parse a response to the follow-up query. Moreover, method 500 can further include the system-level assistant component initially parsing a response to follow-up query and then handing off to the application-level assistant component.

In some implementations, the system-level assistant component can perform an automatic speech recognition (ASR) technique and application-level assistant component can perform a natural-language understanding (NLU) technique.

In some implementations, the application-level assistant component is a third-party component.

In some implementations, method 500 further includes the computing device receiving content item comprising application-level assistant component, the content item obtained from a real-time content selection component of a remote server (e.g., server computing system 130). For example, a custom chatbot experiences for businesses can be performed by the computing device by receiving content items from a real-time content selection component of the server computing system 130.

In some implementations, method 500 further includes the computing device retrieving, using application-level assistant component, a content item obtained from a real-time content selection component of a remote server, the content item comprising the application.

In some implementations, method 500 can further include retrieving, using the application-level assistant component, a content item obtained from a real-time content selection component of a remote server, the content item comprising the application.

In some implementations, the system-level assistant component can be running as part of an operating system of the computing device.

In some implementations, the automation system 200 can automate the journey using a hierarchical approach. For example, the application-level assistant component 220 can handle the inter-application journeys (e.g., opening a mobile application, sending an intent, or passing parameters between mobile applications), while the system-level assistant component 210 can handle the intra-application journeys (e.g., performing one or more UI actions on a specific activity of a mobile application, performing one or more UI actions on a specific page of a mobile application).

Figure 6:
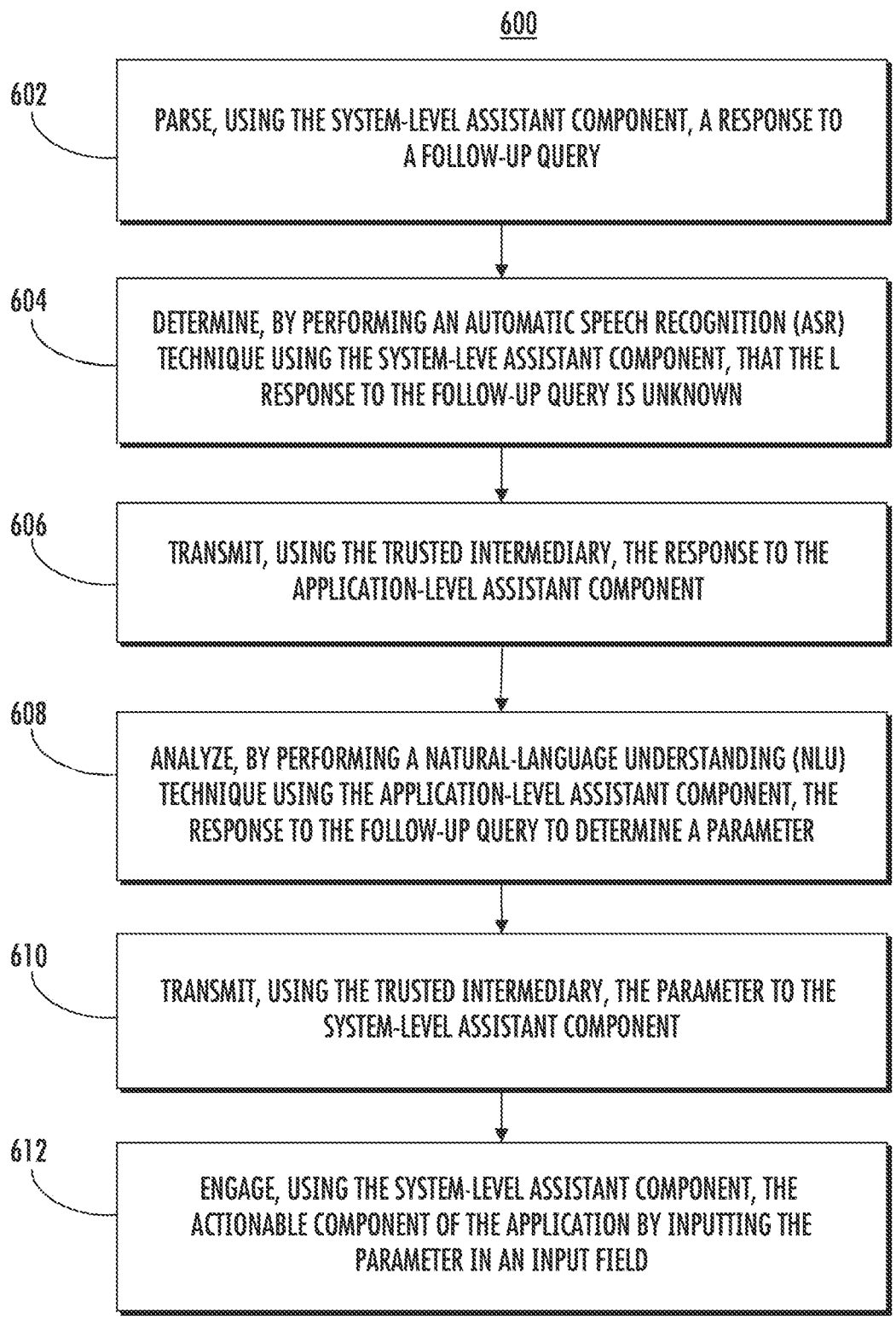
FIG. 6 depicts a flow chart diagram of an example method of a human-in-the-loop implementation for inputting a missing parameter, according to example embodiments of the present disclosure.

FIG. 6 depicts a flow chart diagram of a human-in-the-loop example method for automating an action to be performed on a mobile application according to example embodiments of the present disclosure. Although FIG. 6 depicts steps performed in a particular order for purposes of illustration and discussion, the methods of the present disclosure are not limited to the particularly illustrated order or arrangement. The various steps of method 600 can be omitted, rearranged, combined, and/or adapted in various ways without deviating from the scope of the present disclosure.

Continuing with method 500, the engaging the actionable component can include the automation system 200 determining missing information. The method 500 can further include the operations of method 600.

In some implementations, the system-level assistant component 210 or the application-level assistant component 220 can generate a follow-up query (e.g., a question for the user to answer). The follow-up query can be generated in response to a determination at 508 that information to be inputted is missing.

At 602, the computing device (e.g., automation system 200) can parse, using the system-level assistant component, a response to the follow-up query.

At 604, the computing device can determine, by performing an automatic speech recognition (ASR) technique using the system-level assistant component, that the response to the follow-up query is unknown. For example, the system-level assistant component 210 cannot determine the intent of the response or the system-level assistant component 210 cannot determine a parameter from the response.

At 606, in response to the determination that the response is unknown at 604, the computing device can transmit, using the trusted intermediary 230, the response to the application-level assistant component 220. The response can be securely transmitted, using the trusted intermediary 230, from the system-level assistant component 210 to the application-level assistant component 220 so that the user does not have to repeat the answer to the query twice.

At 608, the computing device can analyze, by performing a natural-language understanding (NLU) technique using the application-level assistant component, the response to the follow-up query to determine a parameter.

At 610, the computing device can transmit, using the trusted intermediary, the parameter to the system-level assistant component.

At 612, the computing device can engage, using the system-level assistant component, the actionable component of the application by inputting the parameter in an input field.

In some implementations, the operations in method 600 can further include modifying a sequence of tasks being performed by the system-level assistant component based on a response to the follow-up query. For example, the human-in-the-loop implementations of the techniques described herein allows for the modification of tasks (e.g., path for performing an activity can be modified) based on an input from the user.

Figure 7:
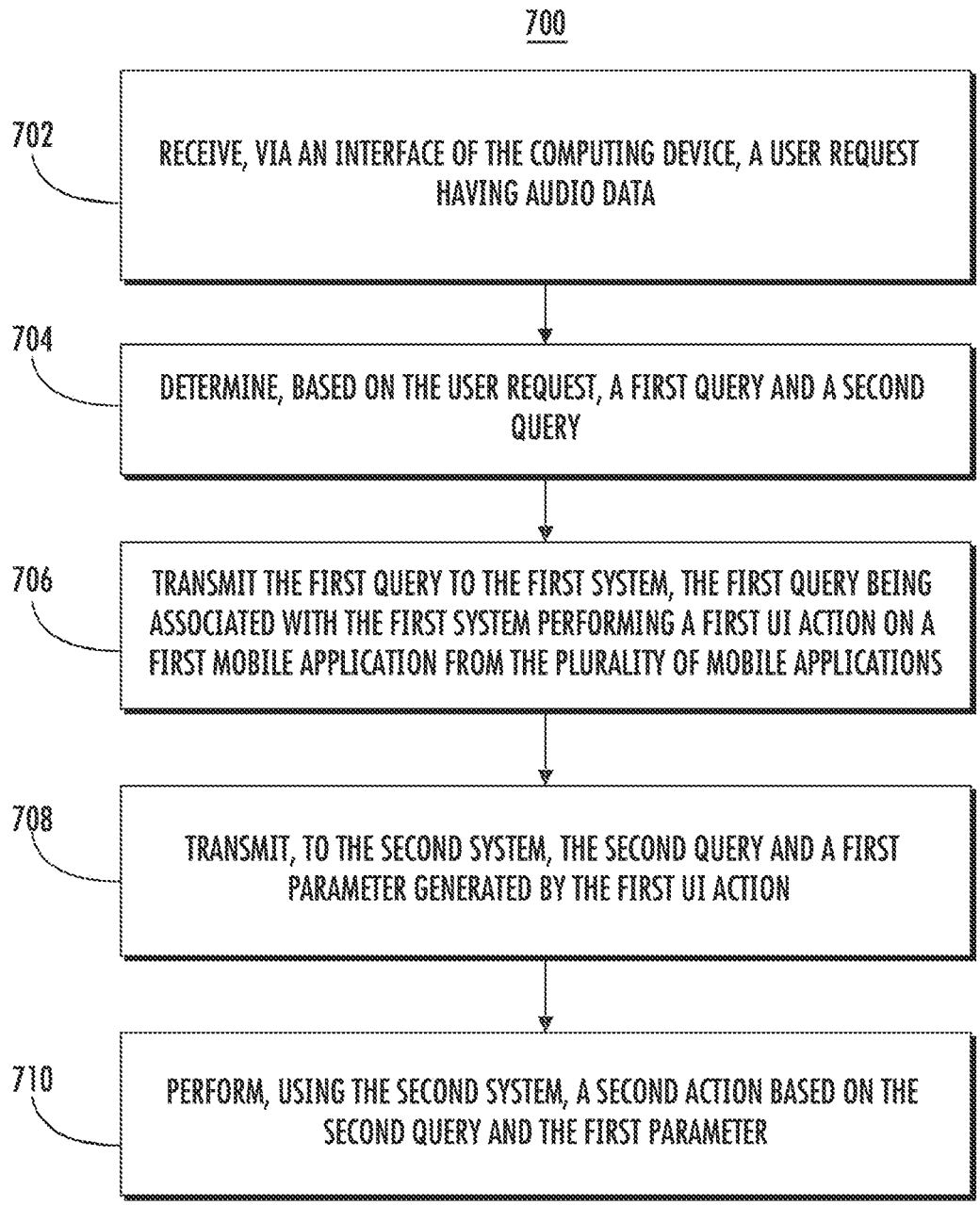
FIG. 7 depicts a flow chart diagram of another example method to automating an action to be performed on a mobile application according to example embodiments of the present disclosure.

FIG. 7 depicts a flow chart diagram of another example method for automating an action to be performed on a mobile application according to example embodiments of the present disclosure. Although FIG. 7 depicts steps performed in a particular order for purposes of illustration and discussion, the methods of the present disclosure are not limited to the particularly illustrated order or arrangement. The various steps of method 700 can be omitted, rearranged, combined, and/or adapted in various ways without deviating from the scope of the present disclosure.

In some implementations, a computing device (e.g., user computing device 102, server computing system 130, automation system 200, speaker 305, client device 340) can include an automation system (e.g., automation system 200). For example, the first system can be the system-level assistant component 210 in FIG. 2. The first system can perform user interface (UI) actions on a plurality of mobile applications. The second system can include a virtual assistant application, such as the application-level assistant component 220 in FIG. 2. The third system can have one or more application program interfaces (APIs) between the first system and the second system, such as the trusted intermediary component 230 in FIG. 2. Additionally, the automation system can include one or more processors, and a memory storing instructions that when executed by the one or more processors cause the computer device to perform operations described in method 700.

At 702, the computing device can receive, via an interface of the computing device, a user request (e.g., user input data) having audio data. The user input 205 in FIG. 2 can be an example of the user request received at 702.

At 704, the computing device can determine, based on the user request, a first query and a second query. For example, the first query and the second query can be obtained from the plurality of UI scripts 270 in FIG. 2. In some instances, the computing device can determine (e.g., obtain from the plurality of UI scripts 270 in FIG. 2) a first UI script and a second UI script based on the user request.

For example, the automation system 200 can use the user request to derive the parameters for a first query (e.g., first task, first activity, first action), a second query (e.g., second task), a third query (e.g., third task), and any subsequent queries (e.g., subsequent tasks). The automation system 200 can also send the data back to the application-level assistant component 220 (e.g., user-space virtual assistant application) so that the application-level assistant component 220 can alter the following tasks or ask relevant clarification questions to the user At 706, the computing device can transmit the first query to the first system. The first query can be associated with the first system performing a first UI action on a first mobile application from the plurality of mobile applications. In some implementations, the first UI action can be a low-level action as described in FIG. 2.

For example, the first UI action performed by the first system can be scrolling and/or clicking a button on a page of the first mobile application.

In some implementations, the first system can include a system-level assistant component (e.g., system-level assistant component 210 in FIG. 2) running as part of an operating system of the computing device. The operating system can be software that acts as an interface between computer hardware components and a user.

In some implementations, the computing device can be a mobile device. Additionally, the first system can be part of the middleware of the mobile device. The middleware is the software that lies between an operating system and the applications running on it.

At 708, the computing device can transmit, to the second system, the second query and a first parameter generated by the first UI action to the second system. The second query can be determined at 704. The first parameter and the second query can be transmitted using the third system. For example, the automation system 200 can transmit the first parameter from the system-level assistant component 210 to the application-level assistant component 220 by using the trusted intermediary component 230 between the system-level assistant component 210 and the application-level assistant component 220.

In some implementations, the trusted intermediary component 230 includes a middleware API. In some implementations, the trusted intermediary component 230 includes an operating system kernel API. In some implementations, the trusted intermediary component 230 includes a direct remote procedure call (RPC)-based API.

At 710, the computing device can perform, using the second system, a second action (e.g., high-level) based on the second query and the first parameter. For example, the automation system 200 can perform a high-level action by using the application-level assistant component 220. Examples of high-level actions are described in FIG. 2. Additionally, the application-level assistant component 220 can perform the high-level action based on the second query (e.g., a second UI script that is obtained from the plurality of UI scripts 270 in FIG. 2).

In some implementations, the first system can have system-level privileges that are higher than privileges associated with the application-level assistant component (e.g., application-level assistant component 220) application of the second system. In some implementations, the high-level action performed by the second system is to play a video.

In some implementations, the virtual assistant application is stored in virtual memory associated with a user-space. In some implementations, the parameters transferred between the first system and the second system are only transmitted using the third system.

In some implementations, method 700 can also include the computing device obtaining user consent before the first system performs the first UI action on the first mobile application. Additionally, the computing device can display, while the first system is performing the first UI action, an indicator on a display of the computing device that the first system is controlling the computing device.

Figure 8:
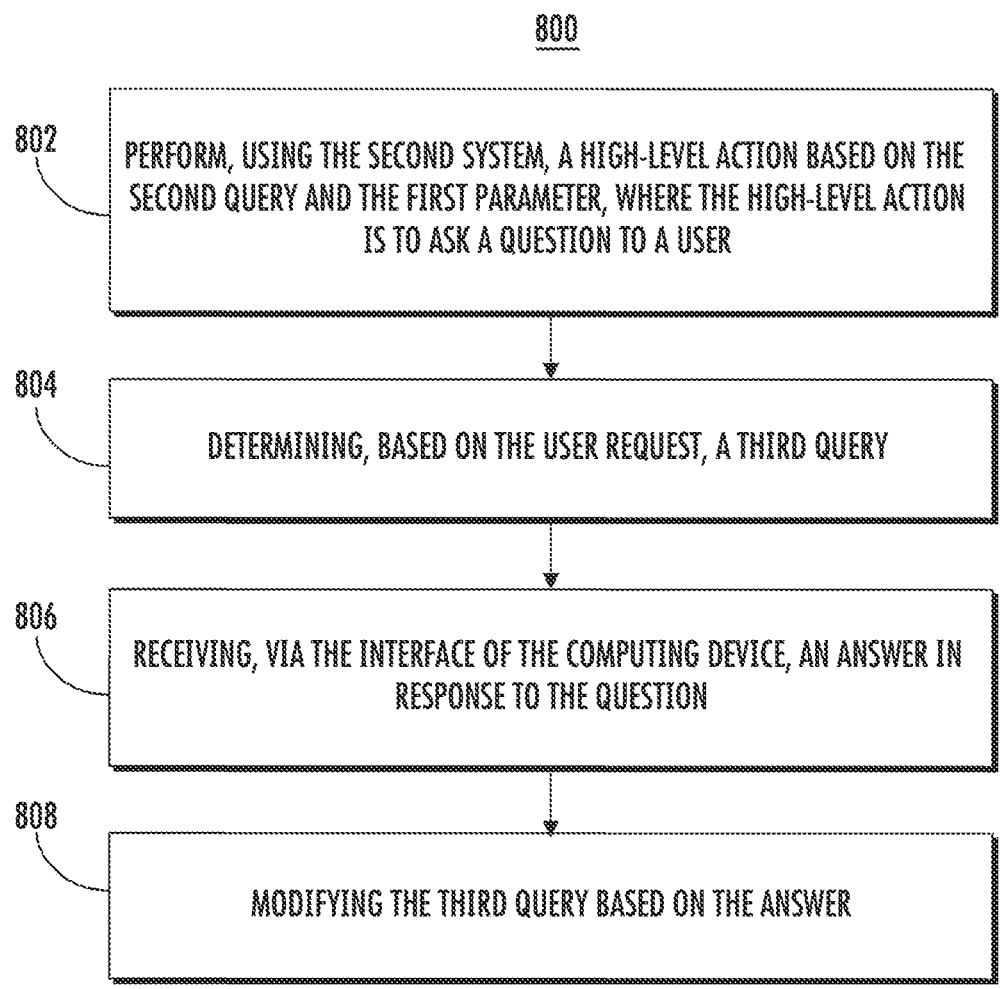
FIG. 8 depicts a flow chart diagram of an example method of a human-in-the-loop implementation for modifying a query, according to example embodiments of the present disclosure.

FIG. 8 depicts a flow chart diagram of an example method of a human-in-the-loop implementation for modifying a query, according to example embodiments of the present disclosure. Although FIG. 8 depicts steps performed in a particular order for purposes of illustration and discussion, the methods of the present disclosure are not limited to the particularly illustrated order or arrangement. The various steps of method 800 can be omitted, rearranged, combined, and/or adapted in various ways without deviating from the scope of the present disclosure.

At 802, continuing with method 700, the computing device can perform, using the second system, a high-level action based on the second query and the first parameter. The operation 602 can be similar to operation 710 of method 700. The high-level action can be to ask a clarifying question to the user associated with the user input received at 702.

At 804, the computing device can determine, based on the user request, a third query.

At 806, the computing device can receive, via the interface of the computing device, an answer in response to the question.

At 808, the computing device can modify the third query based on the answer.

In some implementations, the modification of the third query includes altering one or more parameters being transmitted between the first system and the second system.

In some implementations, the modification of the third query includes altering a sequence path associated with subsequent queries to be performed by the first system or the second system.

Figure 9:
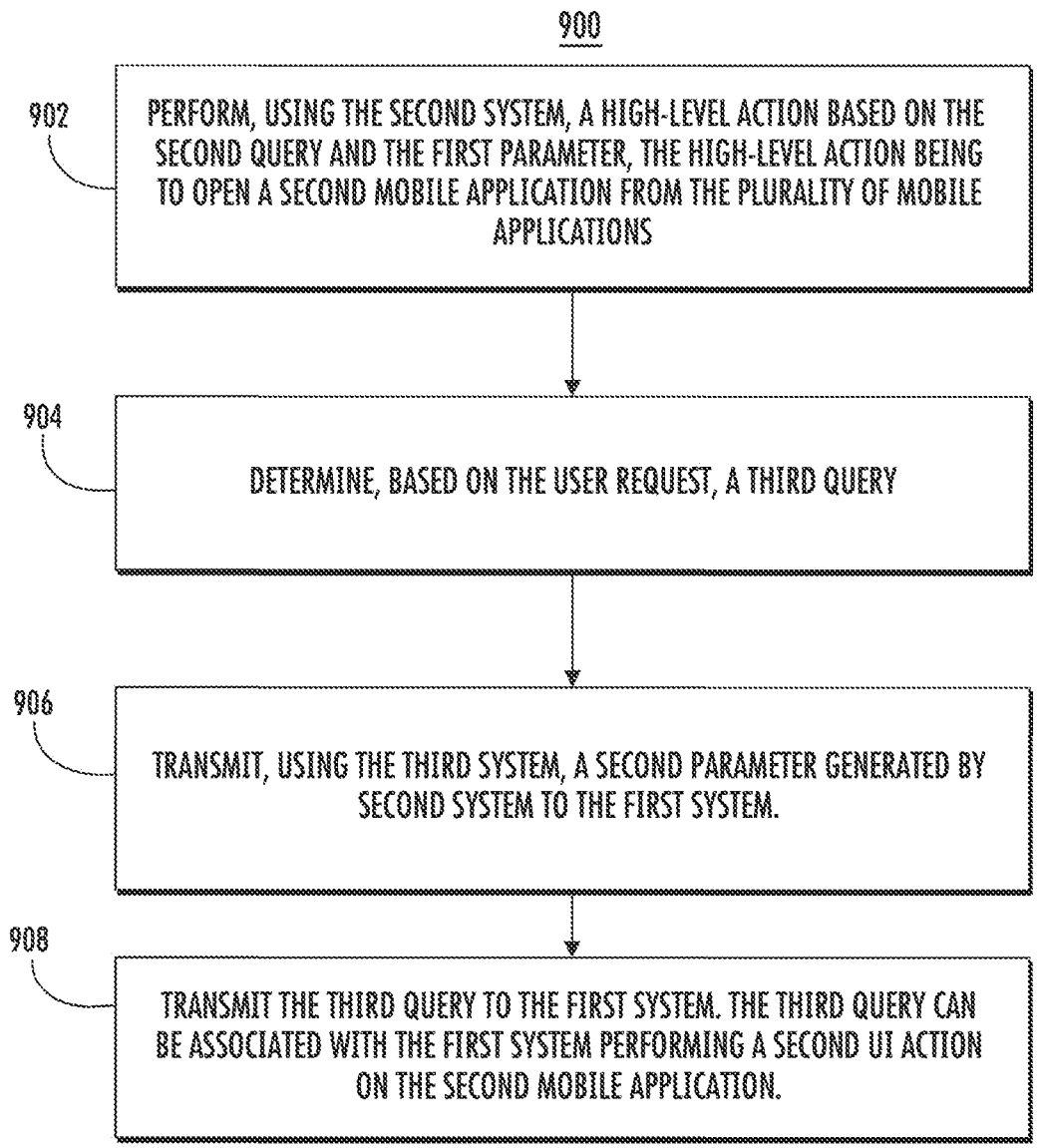
FIG. 9 depicts a flow chart diagram of an example method to securely transfer data between two mobile applications, according to example embodiments of the present disclosure.

FIG. 9 depicts a flow chart diagram of an example method to securely transfer data between two mobile applications, according to example embodiments of the present disclosure. Although FIG. 9 depicts steps performed in a particular order for purposes of illustration and discussion, the methods of the present disclosure are not limited to the particularly illustrated order or arrangement. The various steps of method 900 can be omitted, rearranged, combined, and/or adapted in various ways without deviating from the scope of the present disclosure.

At 902, continuing with method 700, the computing device can perform, using the second system, a high-level action based on the second query and the first parameter. The operation 702 can be similar to operation 710 of method 700. The high-level action can for the second system to open a second mobile application from the plurality of mobile applications.

At 904, the computing device can determine, based on the user request, a third query.

At 906, the computing device can transmit, using the third system, a second parameter generated by the second system to the first system.

At 908, the computing device can transmit the third query to the first system. The third query can be associated with the first system performing a second UI action on the second mobile application.

Additional Disclosure

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure covers such alterations, variations, and/or equivalents.

The following is a list of aspects of the present disclosure which may or may not be claimed:

Aspect 1. A computing device, comprising:
one or more processors; and
one or more memory devices storing instructions that are executable by the one or more processors to cause the one or more processors to perform operations, the operations comprising:
   determining, based on input data associated with a user of the computing device, an intent associated with performing an action on the computing device;
   invoking, using an application-level assistant component configured to provide an application-level interface on the computing device, execution of an application;
   transmitting, to a system-level assistant component configured to provide a system-level interface with the computing device, instructions to interface with an actionable component a the application, wherein the instructions are transmitted using a trusted intermediary component configured to facilitate an interface between the system-level assistant component and the application-level assistant component; and
   engaging, using the system-level assistant component, the actionable component of the application to perform the action.

Aspect 2. The computing device of aspect 1, wherein the actionable component comprises an input field, and wherein engagement of the actionable component comprises inputting a value in the input field.

Aspect 3. The computing device of aspect 1 or aspect 2, wherein the actionable component comprises a rendered output, and wherein engagement of the actionable component comprises parsing the rendered output to identify input fields.

Aspect 4. The computing device of any preceding aspect, wherein the intent is determined using the application-level assistant component.

Aspect 5. The computing device of any preceding aspect, wherein the trusted intermediary component comprises an application program interface (API).

Aspect 6. The computing device of any preceding aspect, wherein the system-level assistant component generates an input comprising data unavailable to the application-level assistant component.

Aspect 7. The computing device of any preceding aspect, wherein engagement of the actionable component comprises determining missing information, and the operations further comprising:
   initiating a follow-up query requesting the missing information.

Aspect 8. The computing device of aspect 7, wherein the system-level assistant component generates the follow-up query.

Aspect 9. The computing device of aspect 7 or aspect 8, the operations further comprising:
   parsing, using the system-level assistant component, a response to the follow-up query.

Aspect 10. The computing device of aspect 9, the operations further comprising:
   determining, by performing an automatic speech recognition (ASR) technique using the system-level assistant component, that the response to the follow-up query is unknown;
   transmitting, using the trusted intermediary, the response to the application-level assistant component; and analyzing, by performing a natural-language understanding (NLU) technique using the application-level assistant component, the response to the follow-up query to determine a parameter.

Aspect 11. The computing device of aspect 10, the operations further comprising:
transmitting, using the trusted intermediary, the parameter to the system-level assistant component; and
engaging, using the system-level assistant component, the actionable component of the application by inputting the parameter in an input field.

Aspect 12. The computing device of any of aspects 7 to 11, the operations further comprising:
modifying a sequence of tasks being performed by the system-level assistant component based on a response to the follow-up query.

Aspect 13. The computing device of any preceding aspect, wherein the system-level assistant component performs an automatic speech recognition (ASR) technique and application-level assistant component performs a natural-language understanding (NLU) technique.

Aspect 14. The computing device of any preceding aspect, wherein the application-level assistant component comprises a third-party assistant component.

Aspect 15. The computing device of any preceding aspect, the operations further comprising:
retrieving, using the application-level assistant component, a content item obtained from a real-time content selection component of a remote server, the content item comprising the application.

Aspect 16. The computing device of any preceding aspect, wherein the system-level assistant component is running as part of an operating system of the computing device or a middleware of the computing device.

Aspect 17. The computing device of any preceding aspect, wherein the system-level assistant component has system-level privileges, wherein the system-level privileges includes one or more privileges not available to the application-level assistant component.

Aspect 18. The computing device of any preceding aspect, wherein the application-level assistant component is opening the application, and wherein the system-level assistant component is performing a user-interface action associated with an activity of the application.

Aspect 19. The computing device of any preceding claim, wherein the computing device is a user computing device, and wherein the application-level assistant component and the system level assistant component are implemented by the user computing device.

Aspect 20. A computer-implemented method comprising:
determining, based on input data associated with a user of a computing device, an intent associated with performing an action on the computing device;
invoking, using an application-level assistant component configured to provide an application-level interface on the computing device, execution of an application;
transmitting, to a system-level assistant component configured to provide a system-level interface with the computing device, instructions to interface with an actionable component of the application, wherein the instructions are transmitted using a trusted intermediary component configured to facilitate an interface between the system-level assistant component and the application-level assistant component; and
engaging, using the system-level assistant component, the actionable component of the application to perform the action.

Aspect 21. The computer-implemented method of aspect 20, wherein the actionable component comprises an input field, and wherein engagement of the actionable component comprises inputting a value in the input field.

Aspect 22. The computer-implemented method of aspect 20 or aspect 21, wherein the actionable component comprises a rendered output, and wherein engagement of the actionable component comprises parsing the rendered output to identify input fields.

Aspect 23. The computer-implemented method of any of aspects 20 to 22, wherein the intent is determined using the application-level assistant component.

Aspect 24. The computer-implemented method of any of aspects 20 to 23, wherein the trusted intermediary component comprises an application program interface (API).

Aspect 25. The computer-implemented method of any of aspects 20 to 24, wherein the system-level assistant component generates an input comprising data unavailable to the application-level assistant component.

Aspect 26. The computer-implemented method of any of aspects 20 to 25, wherein engagement of the actionable component comprises determining missing information, and the operations further comprising: initiating a follow-up query requesting the missing information.

Aspect 27. The computer-implemented method of aspect 26, wherein the system-level assistant component generates the follow-up query.

Aspect 28. The computer-implemented method of aspect 26 or aspect 27, the operations further comprising:
parsing, using the system-level assistant component, a response to the follow-up query.

Aspect 29. The computer-implemented method of aspect 28, the operations further comprising:
determining, by performing an automatic speech recognition (ASR) technique using the system-level assistant component, that the response to the follow-up query is unknown;
transmitting, using the trusted intermediary, the response to the application-level assistant component; and
analyzing, by performing a natural-language understanding (NLU) technique using the application-level assistant component, the response to the follow-up query to determine a parameter.

Aspect 30. The computer-implemented method of aspect 29, the operations further comprising:
transmitting, using the trusted intermediary, the parameter to the system-level assistant component; and
engaging, using the system-level assistant component, the actionable component of the application by inputting the parameter in an input field.

Aspect 31. The computer-implemented method of any of aspects 27 to 30, the operations further comprising:
modifying a sequence of tasks being performed by the system-level assistant component based on a response to the follow-up query.

Aspect 32. The computer-implemented method of any of aspects 20 to 31, wherein the system-level assistant component performs an automatic speech recognition (ASR) technique and application-level assistant component performs a natural-language understanding (NLU) technique.

Aspect 33. The computer-implemented method of any of aspects 20 to 32, wherein the application-level assistant component comprises a third-party assistant component.

Aspect 34. The computer-implemented method of any of aspects 20 to 33, the operations further comprising:
retrieving, using the application-level assistant component, a content item obtained from a real-time content selection component of a remote server, the content item comprising the application.

Aspect 35. The computer-implemented method of any of aspects 20 to 34, wherein the system-level assistant component is running as part of an operating system of the computing device or a middleware of the computing device.

Aspect 36. The computer-implemented method of any of aspects 20 to 35, wherein the system-level assistant component has system-level privileges, wherein the system-level privileges includes one or more privileges not available to the application-level assistant component.

Aspect 37. The computer-implemented method of any of aspects 20 to 36, wherein the application-level assistant component is opening the application, and wherein the system-level assistant component is performing a user-interface action associated with an activity of the application.

Aspect 38. The computer-implemented method of any of aspects 20 to 37, wherein the computing device is a user computing device, and wherein the application-level assistant component and the system level assistant component are implemented by the user computing device.

Aspect 39. One or more non-transitory computer-readable media comprising instructions that when executed by one or more computing devices cause the one or more computing devices to perform operations comprising:
determining, based on input data associated with a user of the computing device, an intent associated with performing an action on the computing device;
invoking, using an application-level assistant component configured to provide an application-level interface on the computing device, execution of an application;
transmitting, to a system-level assistant component configured to provide a system-level interface with the computing device, instructions to interface with an actionable component of the application, wherein the instructions are transmitted using a trusted intermediary component configured to facilitate an interface between the system-level assistant component and the application-level assistant component; and
engaging, using the system-level assistant component, the actionable component of the application to perform the action.

Aspect 40. One or more computer readable media comprising instructions that when executed by one or more computing devices cause the one or more computing devices to perform the method according to any of aspects 20 to 38.

What is claimed is:

1. A computing device, comprising:
one or more processors; and
one or more memory devices storing instructions that are executable by the one or more processors to cause the one or more processors to perform operations, the operations comprising:
determining, based on input data associated with a user of the computing device, an intent associated with performing an action on the computing device;
invoking, using an application-level assistant component configured to provide an application-level interface on the computing device, execution of an application;
transmitting, to a system-level assistant component configured to provide a system-level interface with the computing device, instructions to interface with an actionable component of the application, wherein the instructions are transmitted using a trusted intermediary component configured to facilitate an interface between the system-level assistant component and the application-level assistant component, wherein the trusted intermediary component comprises an application program interface (API); and
engaging, using the system-level assistant component, the actionable component of the application to perform the action.

2. The computing device of claim 1, wherein the API is a middleware API, an operating system kernel API, or a direct remote procedure call (RPC)-based API.

3. The computing device of claim 1, wherein the actionable component comprises an input field, and wherein engagement of the actionable component comprises inputting a value in the input field.

4. The computing device of claim 1, wherein the actionable component comprises a rendered output, and wherein engagement of the actionable component comprises parsing the rendered output to identify input fields.

5. The computing device of claim 1, wherein the intent is determined using the application-level assistant component.

6. The computing device of claim 1, wherein the system-level assistant component generates an input comprising data unavailable to the application-level assistant component.

7. The computing device of claim 1, wherein engagement of the actionable component comprises determining missing information, and the operations further comprising:
initiating a follow-up query requesting the missing information.

8. The computing device of claim 7, wherein the system-level assistant component generates the follow-up query.

9. The computing device of claim 7, the operations further comprising:
parsing, using the system-level assistant component, a response to the follow-up query.

10. The computing device of claim 9, the operations further comprising:
determining, by performing an automatic speech recognition (ASR) technique using the system-level assistant component, that the response to the follow-up query is unknown;
transmitting, using the trusted intermediary, the response to the application-level assistant component; and
analyzing, by performing a natural-language understanding (NLU) technique using the application-level assistant component, the response to the follow-up query to determine a parameter.

11. The computing device of claim 10, the operations further comprising:
transmitting, using the trusted intermediary, the parameter to the system-level assistant component; and
engaging, using the system-level assistant component, the actionable component of the application by inputting the parameter in an input field.

12. The computing device of claim 7, the operations further comprising:
modifying a sequence of tasks being performed by the system-level assistant component based on a response to the follow-up query.

13. The computing device of claim 1, wherein the system-level assistant component performs an automatic speech recognition (ASR) technique and application-level assistant component performs a natural-language understanding (NLU) technique.

14. The computing device of claim 1, wherein the application-level assistant component comprises a third-party assistant component.

15. The computing device of claim 1, the operations further comprising:
retrieving, using the application-level assistant component, a content item obtained from a real-time content selection component of a remote server, the content item comprising the application.

16. The computing device of claim 1, wherein the system-level assistant component is running as part of an operating system of the computing device or a middleware of the computing device.

17. The computing device of claim 1, wherein the system-level assistant component has system-level privileges, wherein the system-level privileges includes one or more privileges not available to the application-level assistant component.

18. The computing device of claim 1, wherein the application-level assistant component is opening the application, and wherein the system-level assistant component is performing a user-interface action associated with an activity of the application.

19. The computing device of claim 1, wherein the computing device is a user computing device, and wherein the application-level assistant component and the system level assistant component are implemented by the user computing device.

20. A computer-implemented method comprising:
determining, based on input data associated with a user of a computing device, an intent associated with performing an action on the computing device;
invoking, using an application-level assistant component configured to provide an application-level interface on the computing device, execution of an application;
transmitting, to a system-level assistant component configured to provide a system-level interface with the computing device, instructions to interface with an actionable component of the application, wherein the instructions are transmitted using a trusted intermediary component configured to facilitate an interface between the system-level assistant component and the application-level assistant component, wherein the trusted intermediary component comprises an application program interface (API); and
engaging, using the system-level assistant component, the actionable component of the application to perform the action.

21. One or more non-transitory computer-readable media comprising instructions that when executed by one or more computing devices cause the one or more computing devices to perform operations comprising:
determining, based on input data associated with a user of the computing device, an intent associated with performing an action on the computing device;
invoking, using an application-level assistant component configured to provide an application-level interface on the computing device, execution of an application;
transmitting, to a system-level assistant component configured to provide a system-level interface with the computing device, instructions to interface with an actionable component of the application, wherein the instructions are transmitted using a trusted intermediary component configured to facilitate an interface between the system-level assistant component and the application-level assistant component, wherein the trusted intermediary component comprises an application program interface (API); and
engaging, using the system-level assistant component, the actionable component of the application to perform the action.

* * * * *